United States Patent
Koma (10) Patent No.: US 6,407,794 B2
(45) Date of Patent: *Jun. 18, 2002

(54) VERTICALLY ALIGNED TYPE LIQUID CRYSTAL DISPLAY

(75) Inventor: Norio Koma, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/768,371

(22) Filed: Jan. 23, 2001

Related U.S. Application Data (62) Division of application No. 09/162,984, filed on Sep. 29, 1998.

(30) Foreign Application Priority Data

Oct. 1, 1997 (JP) .............................. 9-268973

(51) Int. Cl.⁷ ............................................ G02F 1/1343
(52) U.S. Cl. ..................... 349/141; 349/142; 349/144; 349/146
(58) Field of Search .................. 349/141, 142, 349/139, 146, 144

(56) References Cited

U.S. PATENT DOCUMENTS

| | | | |
|---|---|---|---|
| 5,084,778 A | 1/1992 | DeJule et al. ................ | 359/87 |
| 5,136,407 A | 8/1992 | Clerc ......................... | 359/55 |
| 5,229,873 A | 7/1993 | Hirose et al. ................ | 359/55 |
| 5,309,264 A | 5/1994 | Lien et al. ................... | 359/87 |
| 5,608,556 A | 3/1997 | Koma ....................... | 349/143 |
| 5,748,275 A | 5/1998 | Sato et al. ................. | 349/143 |
| 5,808,712 A | 9/1998 | Hishida et al. ............. | 349/95 |
| 5,825,488 A | 10/1998 | Bos et al. ................... | 349/128 |
| 5,855,968 A | 1/1999 | Hirata et al. ............... | 427/533 |
| 5,859,683 A | 1/1999 | Tagusa et al. ............. | 349/138 |
| 6,229,589 B1 * | 5/2001 | Koma ....................... | 349/139 |

FOREIGN PATENT DOCUMENTS

| | | |
|---|---|---|
| EP | 0603866 | 6/1994 |
| EP | 0751417 | 1/1997 |
| EP | 0766119 | 4/1997 |
| JP | 3111818 | 5/1991 |
| JP | 4319920 | 11/1992 |
| JP | 5210114 | 8/1993 |
| JP | 6130394 | 5/1994 |
| JP | 6194657 | 7/1994 |
| JP | 61944656 | 7/1994 |

* cited by examiner

Primary Examiner—William I. Sikes
Assistant Examiner—Julie Ngo
(74) Attorney, Agent, or Firm—Hogan & Hartson, L.L.P.

(57) ABSTRACT

A vertically aligned type liquid crystal display includes a liquid crystal layer disposed between a pixel electrode and a common electrode and containing vertically aligned liquid crystal molecules, the orientation of the liquid crystal molecules being controlled by electric field. An orientation control window is formed in the common electrode located opposite to the pixel electrode and an aspect ration, i.e., a vertical to horizontal length ratio of the pixel electrode is set to at least 2. Alternatively, the pixel electrode is partitioned into at least two electrode regions that each region represents a divided pixel electrode. An orientation control window is formed in the common electrode so as to correspond to each divided pixel electrode, an aspect ratio of each divided pixel electrode is set to at least 2. As such, the influence at the edge sections of the pixel electrode is reduced, viewing angle characteristic and transmittance are improved, and average response time is shortened.

16 Claims, 7 Drawing Sheets

VERTICALLY ALIGNED TYPE LIQUID CRYSTAL DISPLAY

This is a divisional of application Ser. No. 09/162,984 filed Sep. 29, 1998, which application is hereby incorporated by reference in its entirety.

BACKGROUND OF THE INVENTION

1. Field of the Invention

The present invention relates to a liquid crystal display (LCD) which utilizes opto-electric anisotropy of liquid crystal, and more particularly to a liquid crystal display which achieves an improved response speed and transmittance.

2. Description of the Related Art

LCDs are compact, thin, and low power consumption devices and have been developed for practical use in the field of office automation (OA) and audio-visual (AV) equipment. In particular, active matrix type LCDs which utilize thin film transistors (TFTs) as switching elements are theoretically capable of static actuation at a duty ratio of 100% in a multiplexing manner, and have been used in large screen and high resolution type animation displays.

TFTs are field effect transistors arranged in a matrix on a substrate and connected to individual pixel electrodes which form one side of pixel capacitors with a dielectric layer made of liquid crystal. In a TFT matrix, TFTS located on a same row are simultaneously turned on/off by a given gate line, and each TFT of that row receives a pixel signal voltage from a given drain line. A display voltage is accumulated in the pixel capacitors corresponding to the on-state TFTs and designated by rows and columns. The pixel electrodes and the TFTs are formed on the same substrate, while a common electrode acting as the other side of the pixel capacitors is formed on the entire surface of the second substrate opposite to the first substrate across the liquid crystal layer. That is, the display pixels (i.e., pixels) are defined by partitioning the liquid crystal and the common electrode by pixel electrodes. The voltage accumulated in the pixel capacitors is held insulated by an off-state resistance of the TFTs for one field period or one frame period until the TFTs are turned on again. The liquid crystal is opto-electrically anisotropic, and its transmittance is controlled based on the voltage applied to respective pixel capacitors. The transmittance of each display pixel is independently controlled, so that individual pixels are observed bright or dark and recognized collectively as a display image by human eyes.

Initial orientation of the liquid crystal is determined by an orientation film disposed at the interface between the liquid crystal and each substrate. For example, a twisted nematic (TN) type LCD uses the liquid crystal in nematic phase which has positive dielectric anisotropy and whose alignment vectors are twisted 90 degrees between opposing substrates. Typically, a polarizing plate is provided on the outside of each substrate, and an polarizing axis of each polarizing plate coincides with the orientation of the liquid crystal located in the vicinity of the corresponding substrate. When no voltage is applied, linearly polarized light passes through one polarizing plate, turns its direction in the liquid crystal layer along the twisted alignment of the liquid crystal, and exits from the other polarizing plate, resulting in a "white" display. When the voltage is then applied to the pixel capacitors, an electric field is created within the liquid crystal and the orientation of the liquid crystal is changed to be parallel to the direction of the applied electric field because of dielectric anisotropy. This results in the collapse of twisted alignment and less frequent turns of the linearly polarized incoming light in the liquid crystal. Consequently, the amount of light ejecting from the other polarizing plate is reduced and the display gradually becomes black. This is known as a normally white mode which is widely applied in the field of TN cells, in which the display is white when no voltage is applied and changes to "black" upon application of the voltage.

Figure 1:
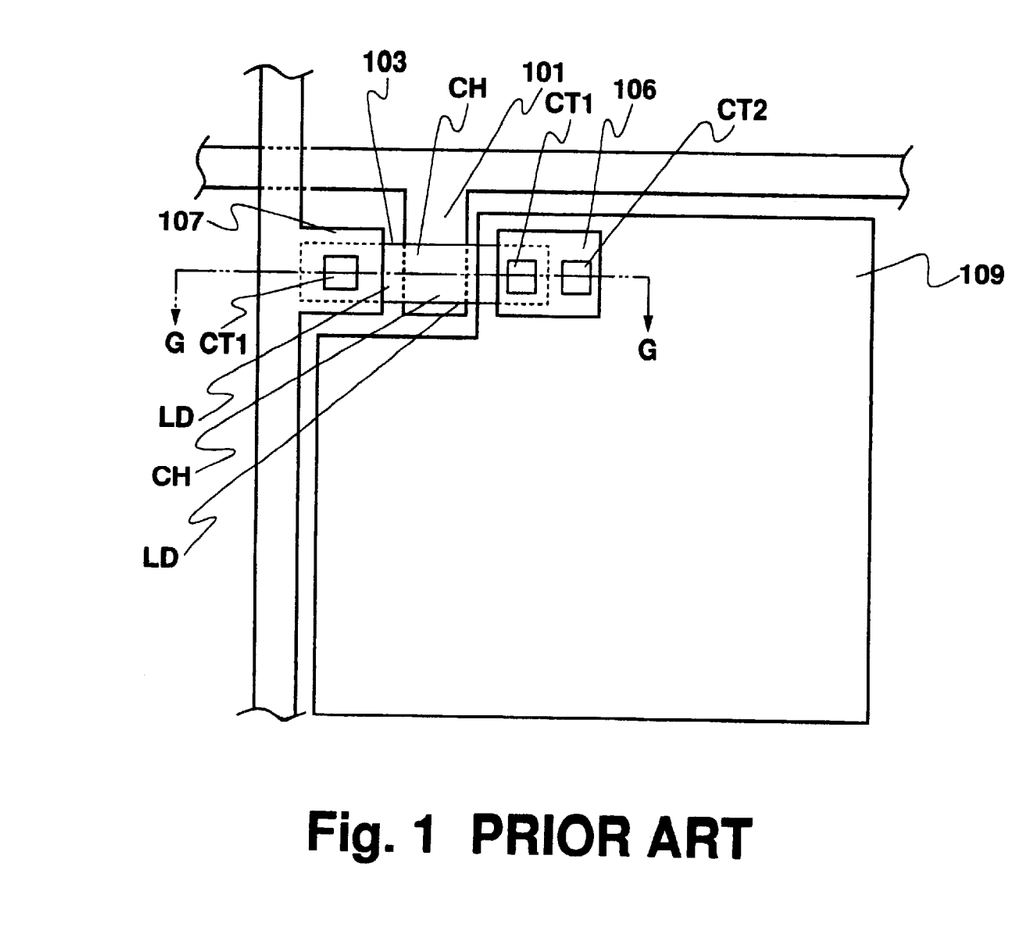
FIG. 1 is a plan view showing a unit pixel of a conventional liquid crystal display.
Figure 2:
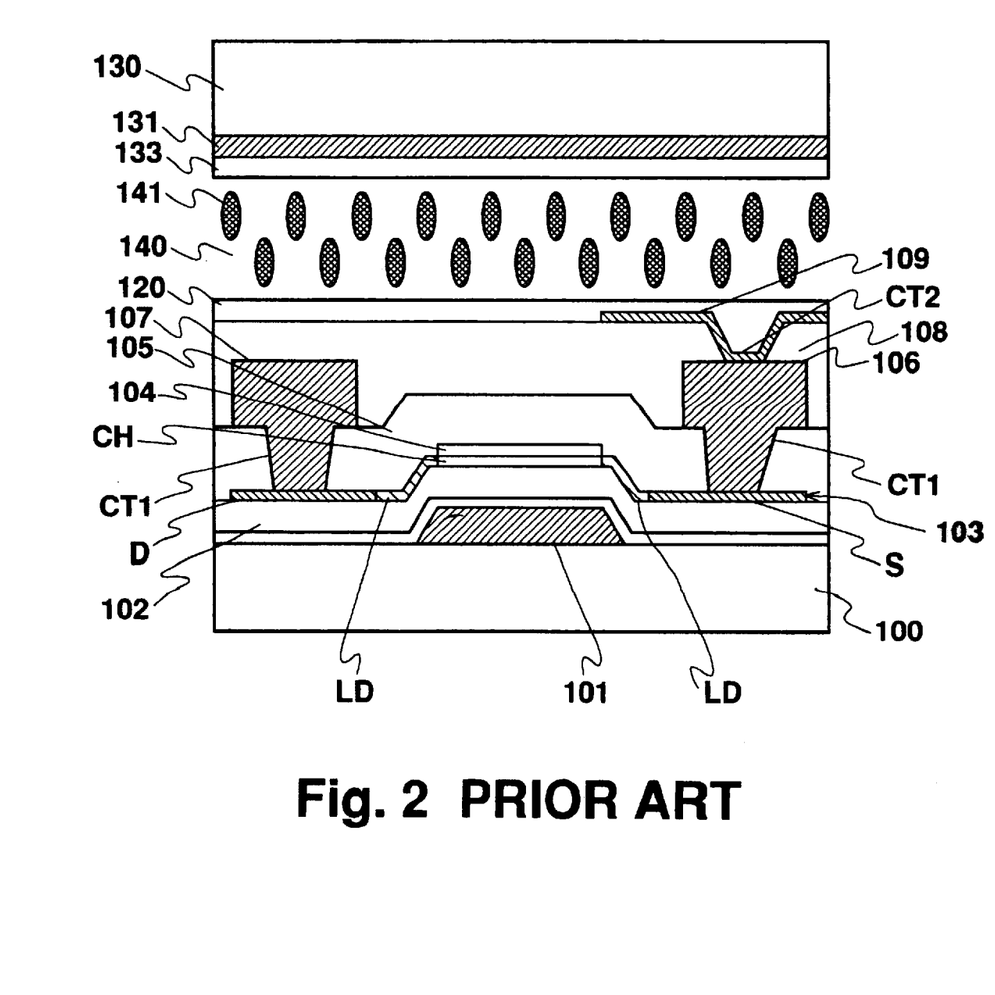
FIG. 2 is a sectional view taken along line G—G of FIG. 1.

FIGS. 1 and 2 show a unit pixel structure of a conventional liquid crystal display, wherein FIG. 1 is a plan view and FIG. 2 is a sectional view along line G—G of FIG. 1. A gate electrode 101 made of a metal, such as Cr, Ta, or Mo, is formed on a substrate 100, and a gate insulating film 102 made of, e.g., SiNx and/or $SiO_2$ is formed to cover the gate electrode 101. The gate insulating film 102 is covered with a p-Si film 103 in which an implantation stopper 104 is used to form a lightly doped region (LD) having a low concentration (N−) of impurities, such as P or As, and source and drain regions (S, D) having a high concentration (N+) of impurities located outside the LD region. A region located immediately below the implantation stopper 104 is an intrinsic layer which includes substantially no impurities and acts as a channel region (CH). The p-Si 103 is covered with an interlayer insulating film 105 made of SiNx or the like. A source electrode 106 and a drain electrode 107, both made of a material such as Al, Mo, or the like, are formed on the interlayer insulating film 105, each electrode being connected to the source region S and the drain region D, respectively, via a contact hole CT1 formed in the interlayer insulating film 105. The entire surface of the thus formed TFT is covered with a planarization insulating film 108 made of SOG (spin on glass), BPSG (boro-phospho silicate glass), acrylic resin, or the like. A pixel electrode 109 made of ITO (indium tin oxide) or the like is formed on the planarization insulating film 108 for actuating the liquid crystal, and is connected to the source electrode 106 via a contact hole CT2 formed in the planarization insulating film 108.

An orientation film 120 formed by a high molecular film, such as polyimide, is disposed on the entire surface on the above elements and undergoes a rubbing treatment to control an initial orientation of the liquid crystal. Meanwhile, a common electrode 131 made of ITO is formed on the entire surface of another glass substrate 130 arranged opposite to the substrate 100 across a liquid crystal layer. The common electrode 131 is covered with an orientation film 133 made of polyimide or the like and undergone rubbing.

As shown herein, a DAP (deformation of vertically aligned phase) type LCD uses a nematic phase liquid crystal 140 having negative dielectric anisotropy, and orientation films 120, 133 formed by a vertical orientation film. The DAP type LCD is one of the electrically controlled birefringence (ECB) type LCDs which use a difference of refractive indices of longer and shorter axes of a liquid crystal molecule, so-called a birefringence, to control transmittance. In the DAP type LCD, upon application of a voltage, an incoming light transmits one of two orthogonal polarization plates and enters the liquid crystal layer as a linearly polarized light, and is birefracted in the liquid crystal to become an elliptically polarized light. Then, retardation, which is a difference of phase velocity between ordinary and extraordinary ray components in the liquid crystal, is controlled according to an intensity of the electric field of the liquid crystal layer to allow the light to be emitted from the other polarization plate at a desired transmittance. In this case, the display is in a normally black mode, since the display is black when no voltage is applied and changes to white upon application of an appropriate voltage.

As described above, the liquid crystal display displays an image at an intended transmittance or color phase by applying a desired voltage to the liquid crystal sealed between a pair of substrates having predetermined electrodes formed thereon and by controlling a turning route or a birefringence of light in the liquid crystal. Specifically, the retardation is controlled by changing the alignment of the liquid crystal, to thereby adjust the light intensity of the transmitted light in the TN mode, while allowing the separation of color phases in the ECB mode by controlling a spectroscopic intensity depending on wavelength. Since the retardation depends on the angle between the longer axis of the liquid crystal molecule and the orientation of the electric field, the retardation still changes relative to the viewer's observation angle, i.e., a viewing angle, even when such an angle is primarily controlled by the adjustment of the electric field intensity. As the viewing angle changes, the light intensity or the color phase of the transmitted light also changes, causing a so-called viewing angle dependency problem.

Problems of decreased transmittance and slower response speed also remain.

SUMMARY OF THE INVENTION

The present invention is made to solve the above problems and provides a vertically aligned type liquid crystal display including a vertically aligned liquid crystal layer disposed between a plurality of pixel electrodes and a common electrode facing the plurality of pixel electrodes, wherein the orientation of the liquid crystal layer is controlled by electric field, the common electrode has an orientation control window formed in an area corresponding to each of the plurality of pixel electrodes, and a ratio of vertical to horizontal length of each of the plurality of pixel electrode is equal to or more than 2.

In another aspect of the present invention, a vertically aligned type liquid crystal display includes an orientation control window formed in a common electrode corresponding to each of a plurality of pixel electrodes, wherein each of the plurality of pixel electrodes is divided into two or more electrically connected electrode regions, and a ratio of vertical to horizontal length of each electrode region is larger than that of each of the plurality of pixel electrodes.

In still another aspect of the present invention, a liquid crystal display includes a plurality of pixel electrodes, each pixel electrode being divided into two or more electrically connected electrode regions having a vertical to horizontal length ratio of equal to or more than 2.

In a further aspect of the present invention, the orientation control window is in the form of a slit which extends longitudinally in an area corresponding to the center part of each pixel electrode or electrode region.

In a still further-aspect of the present invention, the orientation control window is in the form of a slit which forks at both longitudinal ends of the electrode or electrode region toward corner sections of the pixel electrode.

In addition, each pixel electrode may be divided into a plurality of electrode regions, and one orientation control window is formed for each electrode region.

The present invention includes the above features and reduces the influence at edge sections of the pixel electrodes by the combination of the above-mentioned orientation control window and the pixel electrodes, thereby achieving improved viewing angle characteristic and transmittance and a reduced average response time of the display.

As is apparent from the above description, the influence at the edge sections of the pixel electrode is reduced, the viewing angle characteristic and the transmittance are improved, and the average response time is shortened by setting an aspect ratio (V/H) of each pixel electrode or divided pixel electrode to at least a predetermined value.

DESCRIPTION OF THE PREFERRED EMBODIMENTS

Figure 3:
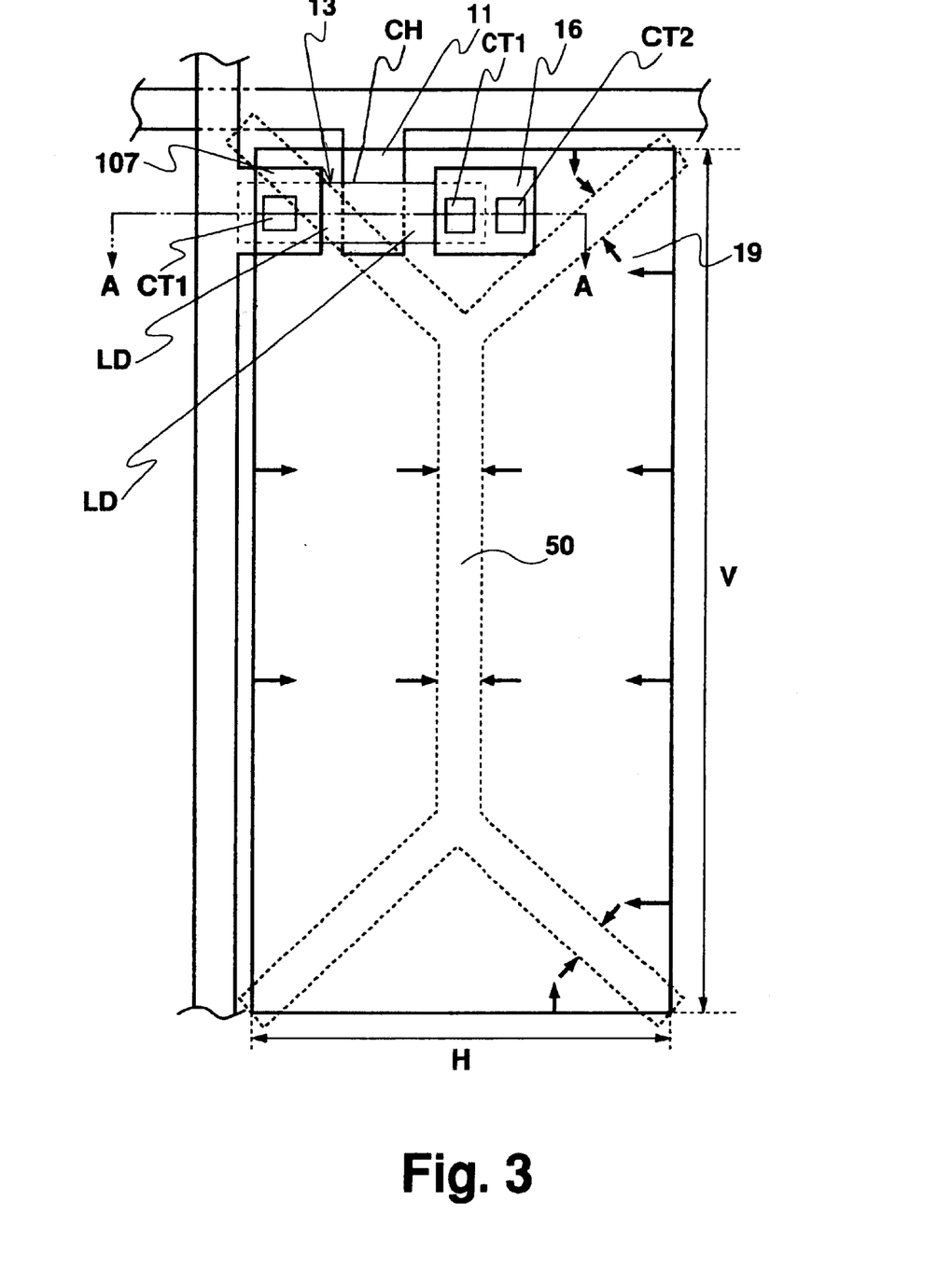
FIG. 3 is a plan view showing a unit pixel of a liquid crystal display according to a first embodiment of the present invention.
Figure 4:
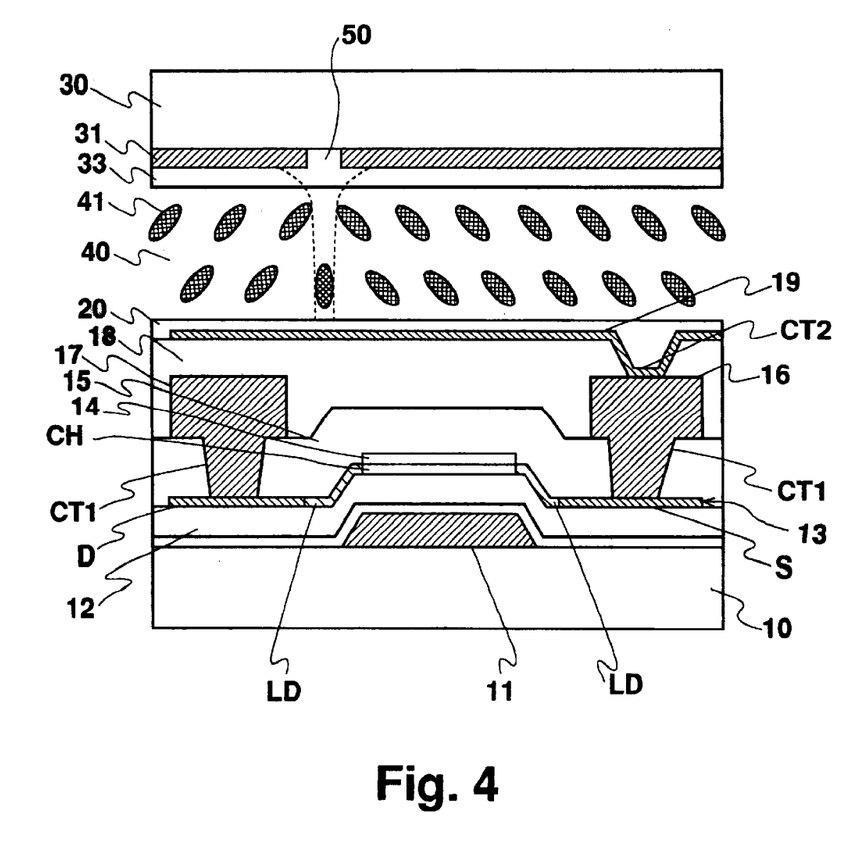
FIG. 4 is a sectional view taken along line A—A of FIG. 3.

Referring to FIGS. 3 and 4, a unit pixel structure of a liquid crystal display according to the present invention is shown, wherein FIG. 3 is a plan view and FIG. 4 is a sectional view taken along line A—A of FIG. 3. A gate electrode 11 made of a metal, such as Cr, Ta, or Mo, is formed on a substrate 10, and a gate insulating film 12 made of, e.g., SiNx and/or $SiO_2$ is formed to cover the gate electrode 11. The gate insulating film 12 is covered with p-Si 13 in which an implantation stopper 14 is used to form a lightly doped region (LD) having a low concentration (N−) of impurities, such as P or As, and source and drain regions (S, D) having a high concentration (N+) of impurities located outside the LD region. A region located immediately below the implantation stopper 14 is an intrinsic layer which includes substantially no impurities and acts as a channel region (CH). The p-Si 13 is covered with an interlayer insulating film 15 made of SiNx or the like. A source electrode 16 and a drain electrode 17, both made of Al, Mo, or the like, are formed on the interlayer insulating film 15, each electrode being connected to the source region S and the drain region D, respectively, via a contact hole CT1 formed in the interlayer insulating film 15. The entire surface of the thus formed TFT is covered with a planarization insulating film 18 made of SOG (spin on glass), BPSG (boro-phospho silicate glass), acrylic resin, or the like. A pixel electrode 19 made of ITO (indium tin oxide) or the like is formed on the planarization insulating film 18 for actuating the liquid crystal, and is connected to the source electrode 16 via a contact hole CT2 formed in the planarization insulating film 18.

An orientation film 20 formed by a macro molecular film, such as polyimide, is formed on the entire surface of the above elements, while a common electrode 31 made of ITO is formed on the entire surface of another glass substrate 30 arranged opposite to the substrate 10 across a liquid crystal layer. The common electrode 31 is covered with an orientation film 33 made of polyimide or the like. In the present invention, the orientation films 20, 33 and the liquid crystal 40 are selected so that liquid crystal molecules 41 are aligned vertically.

In addition, an orientation control window 50 is formed in the common electrode 31 facing the pixel electrode 19 and in the form of two upper and lower Y-shaped slits connected symmetrically to each other. More specifically, this window 50 is in the form of a slit which extends in a straight line along a longer edge of the pixel electrode 19 in an area corresponding to the center part of the pixel electrode 19, and forks at an area corresponding to both longitudinal ends of the pixel electrode 19 toward its corner sections. Since the electric field applied to the liquid crystal molecules 41 located below the orientation control window 50 is not sufficiently strong to tilt those molecules 41, they have vertical alignment. Around these molecules 41, however, the electric field is created as indicated by a dotted line in FIG. 4, which controls the molecules 41 to direct their longer axes perpendicular to the applied field. This is also true at the edge sections of the pixel electrode 19 and the longer axes of the liquid crystal molecules 41 are oriented perpendicularly to the electric field. The tilt of these molecules is propagated to other molecules located in the interior of the layer because of continuity of the liquid crystal. Thus, the liquid crystal molecules are oriented in substantially the same direction in the center part of the pixel electrode 19, but the orientation is uneven in the vicinity of the edge sections. It has been found that better viewing angle characteristic and transmittance are achieved when the orientation is uniform.

To achieve this, the present invention sets an aspect ratio, i.e., a vertical to horizontal length ratio V/H of the pixel electrode 19 facing the orientation control window 50 to at least 2. As such, it is possible to enlarge an area where the liquid crystal molecules are oriented in the same direction, while decreasing the share of an unevenly oriented area. This allows the viewing angle characteristic, the transmittance, and even the response speed to be improved.

Figure 5A:
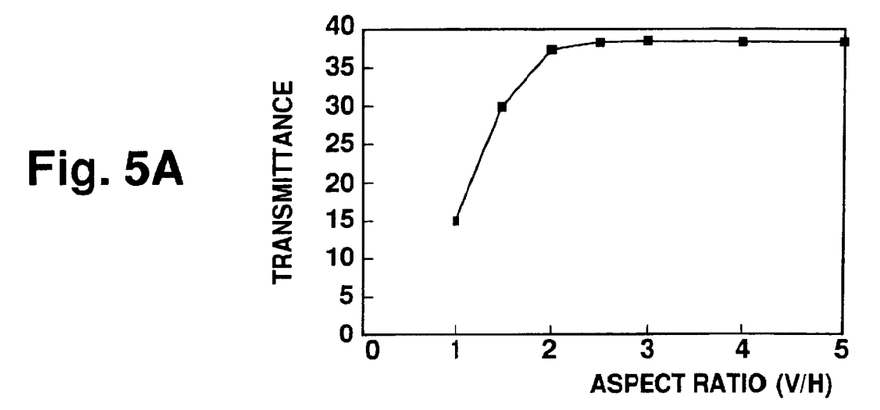
FIGS. 5A and 5B are graphs plotting an aspect ratio of the liquid crystal display as a function of a transmittance and an average response time, respectively, according to the present invention.
Figure 5B:
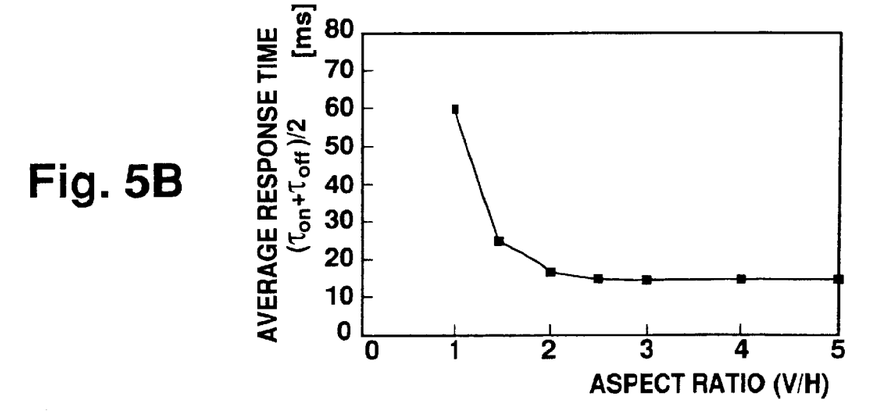

FIGS. 5A and 5B show the experimental results, and plot an aspect ratio (V/H) of the pixel electrode 19 relative to its transmittance and average response time ((τ on+τ off)/2), respectively. As shown in the graph of FIG. 5A, the transmittance was low until the aspect ratio reached 2, and then increased to a preferable value and remained on that value. As shown in the graph of FIG. 5B, the average response time was slow until the aspect ratio reached 2, and then accelerated and generally remained unchanged after that. Namely, at the aspect ratio of the pixel electrode 19 equal to 2 or more, a higher transmittance and a reduced average response time were achieved.

Figure 6:
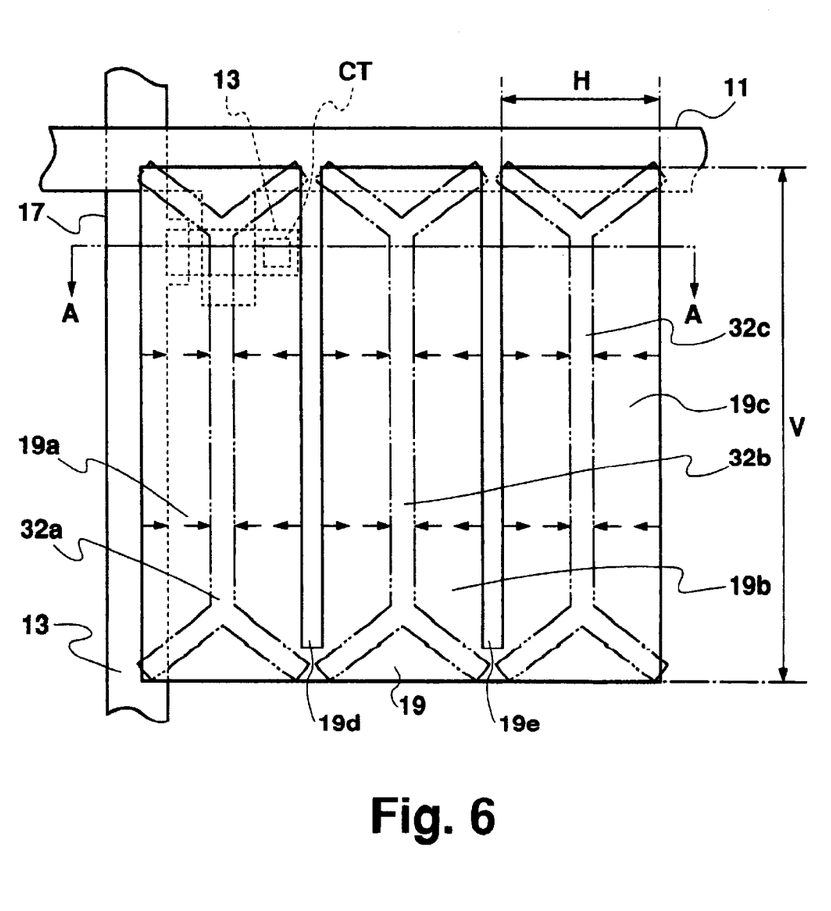
FIG. 6 is a plan view showing a unit pixel of the liquid crystal display according to a second embodiment of the present invention.
Figure 7:
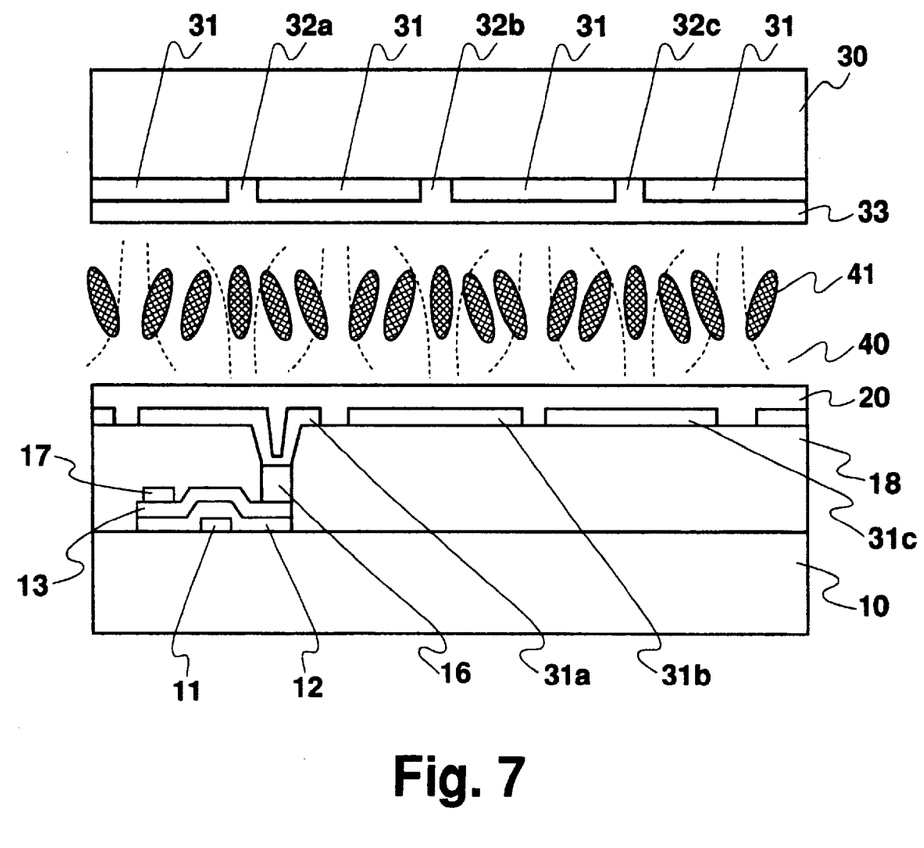
FIG. 7 is a sectional view taken along line A—A of the present invention.

Referring next to FIGS. 6 and 7, a second embodiment of the present invention will be described.

FIG. 6 is a plan view showing a unit pixel structure of the liquid crystal display and FIG. 7 is a sectional view taken along line A—A of FIG. 6. It is to be noted, that for the sake of clarity the TFT structure is not shown in FIG. 7, but it is of the same structure as that shown in FIG. 4.

In this embodiment, the vertical length of the pixel electrode 19 corresponding to the unit pixel is longer than the horizontal length. Thus, slits 19d and 19e are formed vertically like a comb in the pixel electrode 19, dividing (or equally dividing in this embodiment) it into three pixel electrode regions 19a, 19b, and 19c to set the aspect ratio V/H of each pixel electrode region to 2 or more. It is to be noted, however, these pixel electrode regions 19a, 19b, and 19c are partly connected to each other under the slits 19d and 19e, because one display pixel corresponds to one pixel.

Orientation control windows 32a, 32b, and 32c are formed in the common electrode 31 facing the substrate 30, each window corresponding to each pixel electrode section 19a, 19b, and 19c. In each pixel electrode section 19a, 19b, or 19c, the liquid crystal molecules are oriented in reverse about each orientation control window. This increases an uniform orientation area of the liquid crystal molecules, while decreasing an abnormal orientation area at the edge sections of the pixel electrode. Thus, the viewing angle characteristic, transmittance, and response time are also improved, as in the above embodiment.

What is claimed is:

1. A vertically aligned type liquid crystal display, comprising:
a vertically aligned liquid crystal layer disposed between a plurality of pixel electrodes and a common electrode, the orientation of said liquid crystal layer being controlled by electric field,
wherein said common electrode one or more orientation means for defining window formed in an area corresponding to each of said plurality of pixel electrodes,
wherein each of said plurality of pixel electrodes is divided by one or more slits into two or more electrode regions which are electrically connected and arranged in parallel with each other, and a vertical to horizontal length ratio of each electrode region is larger than a vertical to horizontal length ratio of a corresponding one of said plurality of pixel electrodes, and
wherein each said one or more orientation means for defining a window has a slit extending along the direction in which said one or more slits of each of said plurality of pixel electrodes extend.

2. The liquid crystal display according to claim 1, wherein one orientation means for defining a window is formed for each said electrode region.

3. The liquid crystal display according to claim 1, wherein one orientation means for defining a window is formed for each said electrode region, and wherein each of said orientation means for defining a window extends along a longer edge of said electrode region corresponding to the center part of said corresponding electrode region.

4. The liquid crystal display according to claim 3, wherein each said orientation means for defining a window forks at both longitudinal ends of said electrode regions toward corner sections of said electrode region.

5. The liquid crystal display according to claim 4, wherein each one of said plurality of orientation means for defining a window forks at both longitudinal ends of a corresponding one of said electrode regions toward the corner sections of said electrode regions.

6. A vertically aligned type liquid crystal display, comprising:
a vertically aligned liquid crystal layer disposed between a plurality of pixel electrodes and a common electrode, the orientation of said liquid crystal layer being controlled by an electric field,
wherein said common electrode has one or more orientation means for defining a window formed in an area corresponding to each of said plurality of pixel electrodes, and
wherein each of said plurality of pixel electrodes is divided into two or more electrically connected electrode regions, which are arranged in parallel and spaced from each other in the horizontal direction when the direction of the shorter edge and the direction of the longer edge of each of said electrode regions are defined as the horizontal and vertical directions, respectively, and a vertical to horizontal length ratio of each electrode region is equal to or more than two.

7. The liquid crystal display according to claim 6, wherein one orientation means for defining a window is formed for each said electrode region.

8. The liquid crystal display according to claim 6, wherein one orientation means for defining a window is formed for each said electrode regions, and wherein each of said orientation means for defining a window extends along a longer edge of each of said electrode regions in an area corresponding to the center part of each of said electrode regions.

9. The liquid crystal display according to claim 8, wherein each said orientation means for defining a window forks at both longitudinal ends of each of said electrode regions toward corner sections of each of said electrode regions.

10. The liquid crystal display according to claim 6, wherein a vertical to horizontal length ratio of each said two or more electrode regions constituting each of said plurality of pixel electrodes is larger than a vertical to horizontal length ratio of a corresponding one of said plurality of pixel electrodes.

11. A vertically aligned type liquid crystal display, comprising:

a vertically aligned liquid crystal layer disposed between a plurality of pixel electrodes and an opposing or a counter electrode, the orientation of said liquid crystal layer being controlled by an electric field, wherein said opposing or said counter electrode has one or more orientation means for defining a window formed in an area corresponding to each of said plurality of pixel electrodes, wherein each of said plurality of pixel electrodes is divided into two or more electrically connected electrode regions, which are arranged in parallel and spaced from each other in the direction of shorter edges of said electrode regions, and wherein said one or more orientation means for defining a window have a slit extending in the direction of longer edges of said electrode regions.

12. A vertically aligned type liquid crystal display, comprising:

a vertically aligned liquid crystal layer disposed between a plurality of pixel electrodes and a common electrode, the orientation of said liquid crystal layer being control by an electric field, wherein said common electrode has a plurality of orientation means for defining a window formed in areas corresonding to said plurality of pixel electrodes, respectively, wherein each of said plurality of pixel electrodes is divided by a plurality of slits into a plurality of electrode regions, which are electrically connected and arranged in parallel with each other, said plurality of orientation means for defining a window have portions extending along the direction in which the plurality of slits of each of said plurality of pixel electrodes extend and are disposed alternately with the plurality of slits of each of said plurality of pixel electrodes when viewed in a direction perpendicular to each of said plurality of pixel electrodes.

13. The liquid crystal display according to claim 12, wherein said one of said plurality of orientation means for defining a window extends along the longer edge of each of said plurality of electrode regions in a portion facing the center part of each of said plurality of electrode regions.

14. The liquid crystal display according to claim 13, wherein a slit of each of said plurality of orientation means for defining a window forks at both longitudinal ends of corresponding one of said electrode regions toward the corner sections of said electrode regions.

15. A vertically aligned type liquid crystal display, comprising:

a vertically aligned liquid crystal layer disposed between a plurality of pixel electrodes and a common electrode, the orientation of said liquid crystal layer being controlled by an electric field, wherein said common electrode has a plurality of orientation means for defining a window formed in areas corresonding to each of said plurality of pixel electrodes, repectively, wherein each of said plurality of pixel electrodes is divided by one or more slits into two or more electrode regions, which are electrically connected and arranged in parallel with each other, and wherein said plurality of orientation means for defining a window associated with a corresponding one of said plurality of pixel electrodes have portions extending along the direction in which said one or more slits extend, and one of said plurality of orientation means for defining a window is disposed between said two slits and/or between the corresponding one of said one or more slits and a gap between adjoining pixel electrodes.

16. The liquid crystal display according to claim 15, wherein each one of said plurality of orientation means for defining a window extends along the longer edge of each of said electrode regions in a portion facing the center part in each of said two or more electrode regions.

* * * * *